US008762960B2

(12) United States Patent
Baca

(10) Patent No.: US 8,762,960 B2
(45) Date of Patent: Jun. 24, 2014

(54) SOFTWARE PROBE MINIMIZATION

(75) Inventor: David Baca, Roznov Pod Radhostem (CZ)

(73) Assignee: Freescale Semiconductor, Inc., Austin, TX (US)

( * ) Notice: Subject to any disclaimer, the term of this patent is extended or adjusted under 35 U.S.C. 154(b) by 7 days.

(21) Appl. No.: 13/391,744

(22) PCT Filed: Sep. 30, 2009

(86) PCT No.: PCT/IB2009/054270
§ 371 (c)(1),
(2), (4) Date: Feb. 22, 2012

(87) PCT Pub. No.: WO2011/039565
PCT Pub. Date: Apr. 7, 2011

(65) Prior Publication Data
US 2012/0185830 A1    Jul. 19, 2012

(51) Int. Cl.
*G06F 9/44*    (2006.01)

(52) U.S. Cl.
USPC ........... 717/132; 717/124; 717/128; 717/131; 717/130

(58) Field of Classification Search
None
See application file for complete search history.

(56) References Cited

U.S. PATENT DOCUMENTS

| | | | |
|---|---|---|---|
| 5,790,858 A * | 8/1998 | Vogel | 717/130 |
| 5,805,462 A | 9/1998 | Poirot et al. | |
| 6,559,842 B1 | 5/2003 | Deering et al. | |
| 6,668,372 B1 | 12/2003 | Wu | |
| 2003/0229865 A1 | 12/2003 | Bakarian et al. | |
| 2005/0229165 A1 * | 10/2005 | Ma et al. | 717/130 |

OTHER PUBLICATIONS

Ball Thomas et al: "Optimally Profiling and Tracing Programs" ACM Transactions on Programming Languages and Systems, Jul. 1994, pp. 16(3): 1319-1360.
Knuth Donald E et al: "Optimal Measurement Points for Program Frequency Counts" Bit 13 (1973), pp. 313-322.
Agrawal Hirala: "Dominators, Super Blocks, and Program Coverage" In Conference Record of POPL-94: 21st ACM SIGPLAN—SIGACT Symposium on Principles of Programming Languages, pp. 25-34, Portland, OR, 1994.
Ball Thomas et al: "Optimally Profiling and Tracing Programs" Proceedings of the 19th ACM SIGPLAN—SIGACT Symposium on Principles of Programming Languages POPL '92, pp. 1-31.
Ball Thomas et al: "Efficient Path Profiling" Proceedings of the 29th Annual ACM/IEEE International Symposium on Microarchitecture MICRO 29, Dec. 1996, pp. 1-12.
Larus James R: "Efficient Program Tracing" IEEE Computer, 26, 5, May 1993, pp. 52-61.
International Search Report and Written Opinion correlating to PCT/IB2009/054270 dated Jun. 28, 2010.

* cited by examiner

*Primary Examiner* — Lewis A Bullock, Jr.
*Assistant Examiner* — Melissa Alfred

(57) ABSTRACT

A method of developing a tracing solution for the execution of blocks of computer code. The method comprises representing each block of code of an initial tracing solution as a vertex on an initial tracing solution graph. The vertices on the initial tracing solution graph constitute an initial set of vertices. The method further comprises checking whether there are any redundant vertices in the initial set of vertices. Redundant vertices are vertices not needed for a tracing solution. If there are any redundant vertices in the initial set of vertices, one or more of the redundant vertices is eliminated from the initial set of vertices, thereby deriving a reduced set of vertices.

20 Claims, 8 Drawing Sheets

SOFTWARE PROBE MINIMIZATION

FIELD OF THE INVENTION

The invention relates to a method of developing a tracing solution in accordance, an integrated circuit, a system for monitoring the operation of blocks of code on an integrated circuit and a computer program product.

BACKGROUND OF THE INVENTION

Integrated circuits enable the rapid execution of software applications. During software development, it is necessary to analyze how well various parts of the software are functioning. This analysis may lead on to 'de-bugging' of the software and also software testing. De-bugging involves improving software reliability and software performance. Testing serves to exercise parts of the software.

Software is usually built up from blocks. Each block consists of a sequence of instructions that can be entered only at the beginning, and exited only at the end. So, once the program code of a block has begun running, that code will be executed until the end of the block is reached. Then the program control flow may select another block for execution.

FIG. 1 shows a control flow graph, which is a directed graph that provides a diagrammatic representation of the 'program control flow' of the piece of software. A control flow graph consists of vertices, each of which represents a block of software. In this description, the terms 'software block' and 'vertex' mean the same. The vertices in FIG. 1 are numbered 1-14. The control flow graph also shows 'edges', which are the directed arrows connecting the vertices. The software execution flows along the edges, between blocks.

When a piece of software runs, it is important to gather information about which blocks are executed. This information is gathered by 'instrumenting' the source code. The source code of a block is instrumented by placing a 'probe' into it. A probe is a set of instructions whose task is to detect and signal when a particular block runs.

When a probe is encountered during execution of a block, the probe performs an action or set of actions. These actions may include: incrementing a counter to show how many times the block has been executed; marking a flag; or writing a token to a file. Probes may also, or alternatively, be associated with the edges of the control flow graph.

In the prior art, the simplest method of finding out when each of the program blocks executes is to place a 'probe' in every software block. The probe detects each time that each block operates, and signals this to a monitoring system. In effect, the program is instrumented with probes that record passes through every part of the executed program.

The probes allow control flow data to be collected. The control flow data can be used to derive various statistics about control flow execution. These statistics serve to improve understanding of how the software is functioning, and can be used in software development. For example, statistics showing which blocks are executed most frequently can indicate where development effort should be concentrated.

FIG. 2 shows one example of a prior art arrangement 200 for recording signals from probes, and deriving statistics about the operation of blocks in a program.

Integrated circuit 210 runs software that comprises various blocks. Hardware module 220 receives signals from probes located in the software blocks running on integrated circuit 210. Hardware module 220 may provide various statistics, which are derived from the signals received from the probes. Hardware modules such as 220 are known in the prior art, for example from the firm Lauterbach. PC 230 is provided both to load software onto integrated circuit 210, and to receive the information output by block 220. Alternatively, hardware module 220 may be omitted, and integrated circuit 210 may be monitored directly by PC 230. In this case, integrated circuit 210 may contain a trace buffer, which allows recording of the trace for a short period, or the execution can be recorded directly on the PC. Although FIG. 2 describes software running on integrated circuit 210, the software may be running in other systems.

In the arrangement shown in FIG. 2, the simplest way to monitor the usage of each block of software running on integrated circuit 210 is to have one probe in each block. However, there are two problems with this arrangement:

(i) Each time a probe detects and reports that its software block is running, a delay is introduced. Processing within the software block slows or may even effectively stop, when the probe detects activity and reports it to hardware module 220.

(ii) Very large amounts of data are generated, which must be stored for analysis.

Table 1 below lists eight prior art publications.

TABLE 1

List of prior art references

Author and title of reference

[1] D. E. Knuth and F. R. Stevenson. "*Optimal measurement points for program frequency counts*", BIT, 13(3): 313-322, 1973.
[2] Thomas Ball and James R. Larus, "*Optimally profiling and tracing programs*" ACM Transactions on Programming Languages and Systems, 16(4): 1319-1360, July 1994.
[3] Thomas Ball, James R. Larus "*Optimally profiling and tracing programs*", Proceedings of the 19th ACM SIGPLAN-SIGACT symposium on Principles of programming languages POPL '92
[4] Thomas Ball, James R. Larus, "*Efficient path profiling*", Proceedings of the 29th annual ACM/IEEE international symposium on Microarchitecture MICRO 29 Dec. 1996
[5] James R. Larus, "*Efficient Program Tracing*", IEEE Computer, 26, 5 May 1993, pp 52-61
[6] Hiralal Agrawal. "*Dominators, super blocks, and program coverage*", In Conference Record of POPL - 94: 21st ACM SIGPLAN-SIGACT Symposium on Principles of Programming Languages, pages 25-34, Portland, Oregon, 1994.
[7] Youfeng Wu, '*Software profiling method and apparatus*', U.S. Pat. no. 6,668,372
[8] K. R. Vogel, '*Method and system for selecting instrumentation points in a computer program*', U.S. Pat. No. 5,790,858

Three statistical measures are of particular importance in software development. These are 'Profiling', 'Code coverage', and 'Tracing'. Each can serve in the study, analysis and reporting of the behavior of software.

(i) Profiling.

Signals from the blocks can show how often each block of code is executed. So profiling can be used to decide where a greater proportion of software development effort should be focused, e.g. effort to speed up the execution of blocks.

(ii) Code Coverage.

Code coverage identifies which blocks of code were executed at least once, and which were not. It may also be of interest to find out which edges were executed. For example, 'Modified Condition/decision coverage' (MC/DC coverage) involves both blocks and edges. Code coverage is important for verifying software.

(iii) Tracing.

Tracing involves recording which blocks were executed when a program ran, and in which sequence. A trace also provides a count of how many times the same blocks are included in the trace, which is information needed for profiling. Furthermore, tracing provides information about whether or not any particular block is in the trace at all, which is information needed for code coverage.

In order to implement each of techniques (i)-(iii) above, probes are inserted into appropriate blocks. The probes may provide information to:

(i) Counters, in order to infer execution frequencies for profiling;
(ii) Action markers for the executed blocks, for code coverage; and/or
(iii) Tokens to reconstruct the execution trace, for tracing.

A known arrangement for deriving a minimal profiling solution involves constructing a 'spanning tree'. This method can provide the 'Knuth solution' to the profiling problem, referred to in prior art reference [1]. The method involves the following steps:

Step 1.

Create a control flow graph, such as that in FIG. 1, with a vertex for each block of code in a piece of software, and edges connecting the vertices.

Step 2.

Based on the control flow graph, construct a 'reduced graph'. On the reduced graph, each edge corresponds to a vertex on the control flow graph. As the control flow graph edges are merged to represent flow through each vertex, the vertices have to be merged as well. The merged vertices in the reduced graph are called 'super vertices'.

Step 3.

Find a spanning tree of the reduced graph. A weight may be assigned to each reduced graph edge, in order to find a minimal spanning tree. The weight is usually an estimated execution frequency. The spanning tree contains all super vertices and some reduced graph edges, so all the super vertices are connected. Usually, the spanning tree is found by starting from the super vertices and iteratively adding the reduced graph edges, until all super vertices are connected but there is no loop.

Step 4.

The set of edges on the reduced graph spanning tree is now the smallest set of edges that connects all super vertices. These edges correspond to original control flow graph vertices that represent the minimal profiling solution.

In the above approach, the spanning tree is constructed by a process of adding edges to the reduced graph, until the spanning tree is complete.

Returning to the prior art documents listed in Table 1 above:

(i) A known approach to the profiling problem was developed by Knuth, see reference [1]. Knuth applied Kirchhoff's laws to determine a minimal set of vertices. From that minimal set of vertices and their collected execution frequencies, it is possible to infer execution frequencies of all vertices. Counter probes are then only placed in blocks belonging to the minimal set of vertices. This profiling solution reduces the number of blocks that have probes, thereby reducing the delay introduced.

(ii) Reference [7] focuses on software-hardware cooperation for recording a trace.

(iii) Reference [5] incorrectly states that reference [3] presents the minimal solution to the tracing problem.

(iv) References [2] and [3] show that the minimal solution for the profiling problem is also a solution for the tracing problem. However, since this profiling solution is not inherently minimal for tracing, it can't be minimal for profiling. This is because a profile can easily be inferred from a trace. Thus, the minimal profiling solution in publications [1], [2], and [3] is minimal with respect to counter assignment for profiling, but not with respect to probe allocation.

Reference [2] in Table 1 summarizes the known results, including reference [1]. Reference [2] concludes that the tracing problem is 'Non-deterministically polynomial' (NP) complete, and states that the profiling solution of reference [1] can be used for tracing.

SUMMARY OF THE INVENTION

The present invention provides a method of developing a tracing solution in accordance, an integrated circuit, a system for monitoring the operation of blocks of code on an integrated circuit and a computer program product as described in the accompanying claims.

Specific embodiments of the invention are set forth in the dependent claims.

These and other aspects of the invention will be apparent from and elucidated with reference to the embodiments described hereinafter

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

Figure 1:
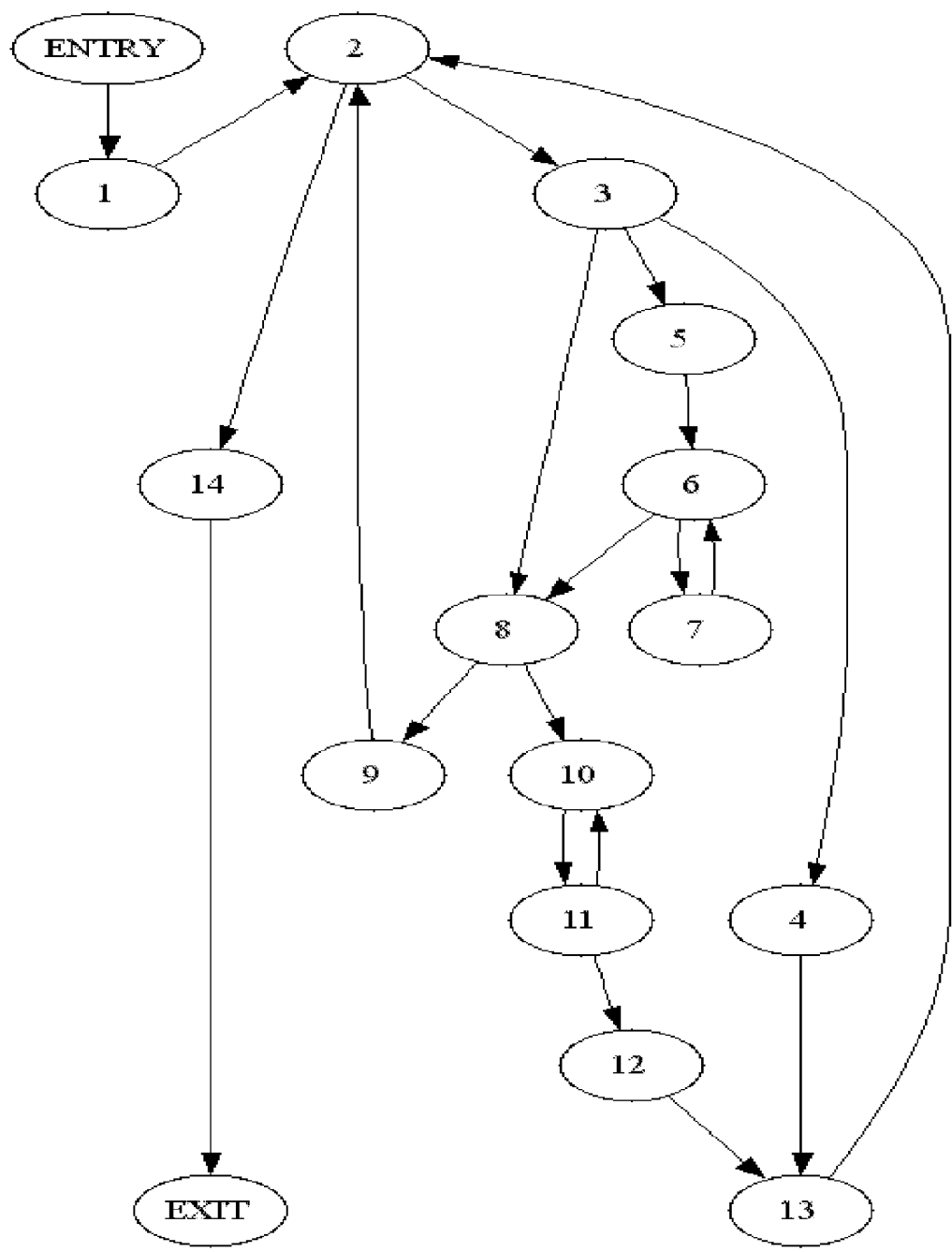
FIG. 1 shows a control flow graph.
Figure 2:
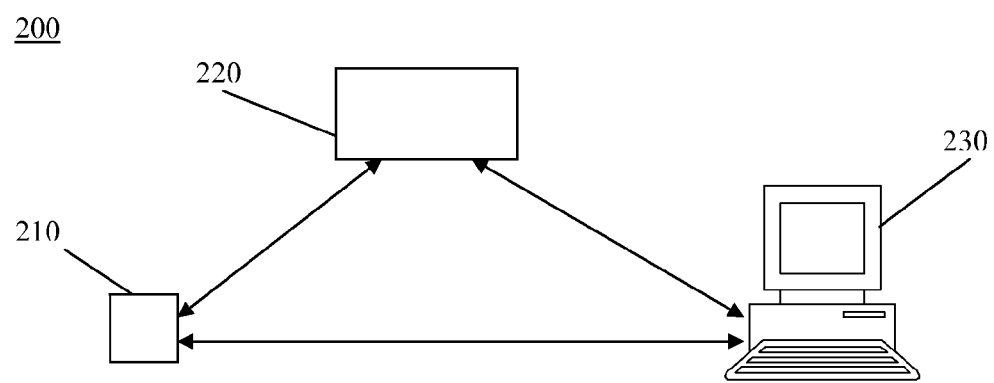
FIG. 2 shows a prior art arrangement for processing signals from probes.

The present invention will now be described with reference to specific examples. Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Any set of vertices of a control flow graph is a solution to the tracing problem, if the execution records of those vertices can be used for reconstructing a complete trace. In contrast, a solution to the profiling problem is a set of vertices from the execution frequencies of all vertices can be determined. The simplest solution to both problems is to probe all vertices.

Although the information derived by tracing can also be used for both profiling and code coverage, tracing may introduce great delay and require storage of a large amount of data. These issues are significant, because a typical software component might comprise 15 or more blocks of code, each of which might be executed 60,000 times per second.

Different problems may be addressed:

(i) minimize, or at least reduce, the number of probes used. This is the 'minimization' problem.

(ii) minimize, or at least reduce, the overhead caused by the probes. This is the 'optimization' problem. Optimization seeks to find a minimal set of probed vertices, which leads to minimal overhead. There can be more than one minimal probe set.

A way to address the minimization problem is to consider program control flow. For example, the activation of a particular first block of code may mean that a second block of code will definitely be used. So a probe in the first block of code can serve to indicate that both the first and second blocks of code have been executed. No separate probe is therefore required in the second block.

A way to address the optimization problem is to seek to allocate probes to code locations that are executed less often. This reduces both the delay introduced by operation of the probes, and the overhead caused by recording the runtime data.

In accordance with an example of an embodiment, a 'locally minimal' tracing solution may be designed and provided. A 'locally minimal' solution is one from which no single vertex can be eliminated, to provide a better solution. An algorithm to find the locally minimal tracing solution is also provided. In addition, a minimal solution for both profiling and code coverage, from the locally minimal solution for tracing may be generated. Thereby, a more efficient collection of control flow execution statistics may be obtained, which can result in less overhead. In addition, if fewer probes are used, then the execution of the code may resemble more closely the non-instrumented original code. Furthermore, if fewer probes are used, then there is less data to be recorded. As a consequence, less memory will may be required and/or longer executions can be recorded.

The locally minimal tracing solution that results is a set of vertices of a control flow graph such that, if one, or more than on vertex is removed from the set, the set is no longer a solution to the tracing problem. In contrast to a locally minimal solution to the tracing problem, a globally minimal solution to the tracing problem would be the absolute smallest set of vertices of the control flow graph that would still provide a solution to the tracing problem. Unfortunately, the task of finding a globally minimal solution can be shown to be an NP (nondeterministic polynomial time)-complete problem.

In accordance with another example of an embodiment, a method for finding and identifying the locally minimal solution may be provided. The method identifies a locally minimal tracing solution by realizing that such a solution cannot be reduced (minimized) any further. As stated earlier, a locally minimal tracing solution is a set of probed vertices (blocks) from which no other vertex can be eliminated, whilst still retaining the property of the set being a tracing solution. On the other hand, if a tracing solution is not locally minimal, there will be vertices that can be removed. Such vertices are called 'redundant' vertices.

Figure 3:
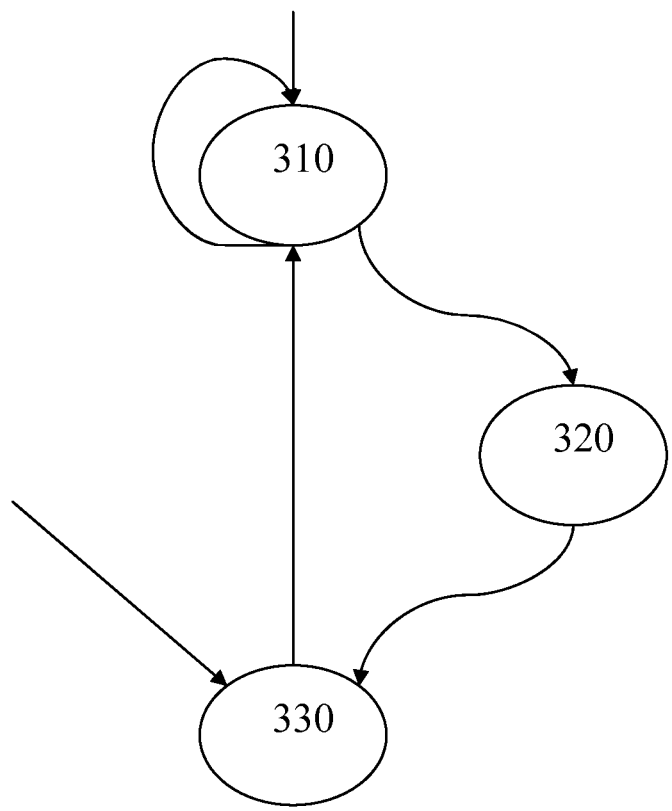
FIG. 3 shows a first example of a case where a vertex is redundant.

FIG. 3 shows an example of how a redundant vertex may be identified, for elimination. In practice, this means that a block of software can be found, which does not need to be instrumented with a probe. References 310, 320 and 330 in FIG. 3 show vertices in a sub-graph that is a part of a program control flow graph.

The Knuth solution would comprise all vertices, namely 310, 320, and 330. In the Knuth solution, the block corresponding to each of vertices 310, 320 and 330 is instrumented with a probe. Vertices 310, 320 and 330 each have an associated counter, which the respective probe increments.

The Knuth solution shown in FIG. 3 is very simple. The frequencies of execution of blocks 310 and 330 have to be measured, for profiling. Since the number of executions of block 330 is independent of the other two blocks, the Knuth solution also contains vertex 320. However, the block corresponding to vertex 320 is executed if and only if the execution flows from 310 to 330. As a result, vertex 320 can be eliminated for the purposes of tracing. This is possible, because any time that the trace records execution sequence [310, 330], then the block corresponding to vertex 320 must also have been executed.

Furthermore, for the purposes of profiling, the counter associated with the vertex 320 can be incremented by the probe at 330 if the execution flows to 330 from 310. It is important to note that there is still a counter associated with vertex 320, even though there is no probe associated with vertex 320.

In conclusion, only the two blocks that correspond to vertices 310 and 330 in FIG. 3 need to be instrumented with probes. As a result, it can be seen that the locally minimal tracing solution also provides either an equivalent or a better solution for profiling.

So, in more general terms, a procedure for identifying a locally minimal solution may use the principle that in finding that there are no redundant vertices. Redundant vertices may for example be found by: (i) constructing a 'tracing solution graph', and (ii) searching for redundant vertices in the tracing solution graph.

The tracing solution graph consists only of vertices that are part of the current tracing solution, and edges that represent paths between the current solution vertices in the original graph. The edges in the tracing solution graph are not edges present in the original graph. They represent paths. A path is a sequence of 'vertex, edge, vertex, edge, . . . , vertex'. The vertices on these paths, except the first and the last vertex, do not belong to the tracing solution.

There is at most one edge of the same direction between any two vertices in the tracing solution graph. This is because, if there were two, the set of probed vertices wouldnot be a tracing solution.

Figure 5:
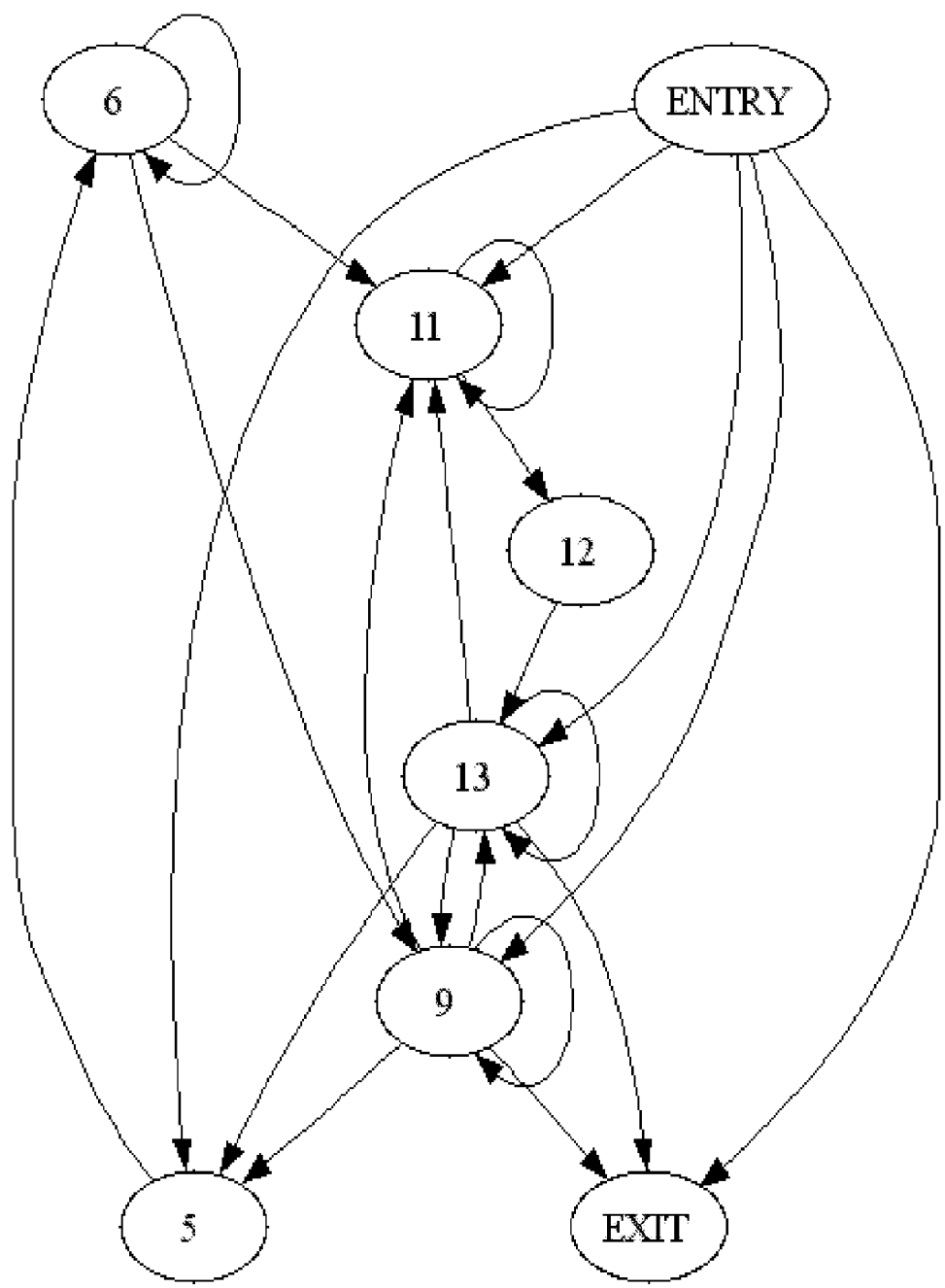
FIGS. 5-7 illustrate an application of an example of a method in accordance with the present.

FIG. 5, which is explained later, shows an example of a tracing solution graph for a Knuth profiling solution that has been derived from the control flow graph of FIG. 1.

Any particular vertex in the tracing solution graph has: (i) One or more 'immediate predecessor' vertices and (ii) One or more 'immediate successor' vertices. An immediate predecessor vertex is one that is at the tail of an edge connected to the particular vertex. An immediate successor vertex is one that is at the head of an edge connected to the particular vertex.

A vertex in the tracing solution graph is redundant if and only if there is no edge between its immediate predecessors to its immediate successors. This fact is provable by a sound, formal mathematical proof, which is not provided here for reasons of brevity.

Figure 4:
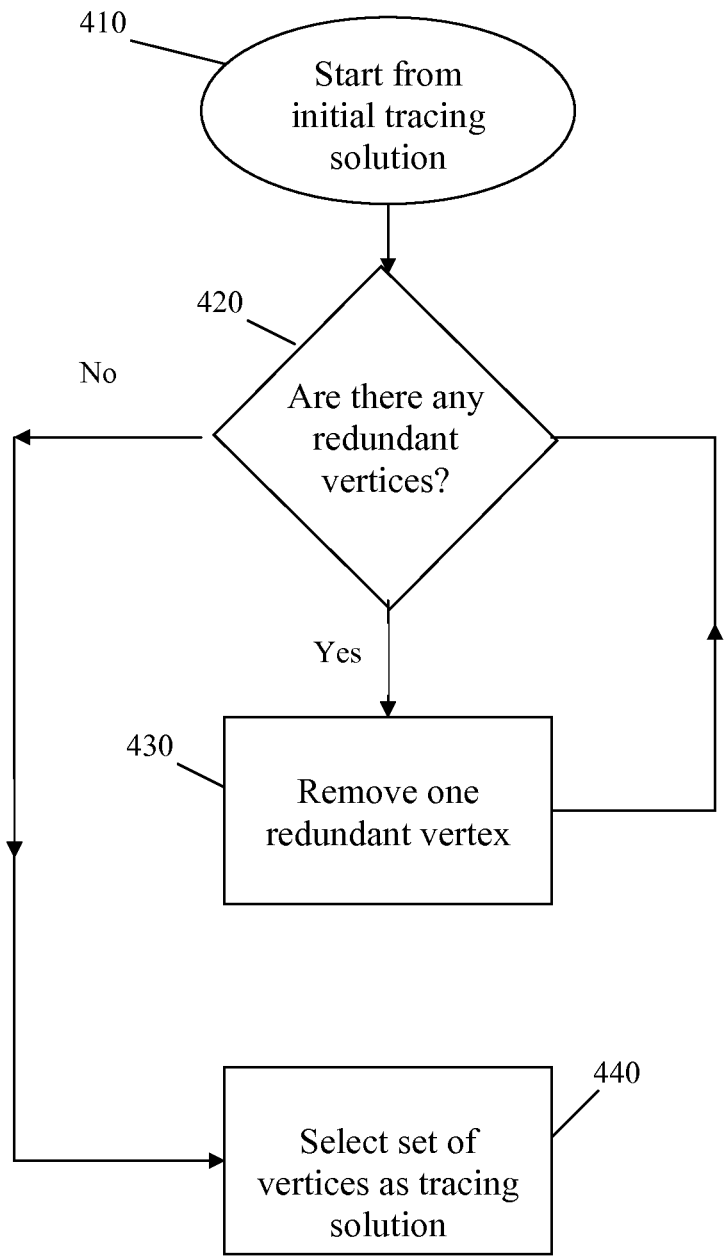
FIG. 4 illustrates an example of an algorithm.

It may be the case that more than one redundant vertex is found in the tracing solution graph. However, in accordance with the method of this example, only one vertex can be removed at a time. This is because the removal of one vertex can lead to another vertex no longer being redundant. Once a redundant vertex is removed, the search for redundant vertices needs to be repeated, starting from the new tracing solution graph construction. This algorithm is depicted in FIG. 4, which is explained later, after consideration of an illustrative numerical example.

The starting point for the algorithm of this example to find a locally minimal solution can be any probed set of vertices that is itself a solution to the tracing problem. Prior art references [2] and [3] state that the Knuth profiling solution is also a solution to the tracing problem. So the invention may start from the Knuth solution. In this case, the invention algorithm will either find a better solution, or determine that the Knuth profiling solution is also a locally minimal solution to the tracing problem.

The Knuth profiling solution, is considered in the prior art to be the best and final profiling solution. In a Knuth profiling solution, each time that a probed block is executed, the probe in that block increments the counter associated with it. So there is one counter for each probed block. This solution provides enough information to infer execution frequencies of all vertices, and therefore is a profiling solution. An alternative version of a Knuth solution is one in which the probes are placed in a minimal set of edges, rather than vertices.

As explained above, using the Knuth solution as an initial solution, all the vertices in the Knuth's profiling solution that do not need to be included in a tracing solution may be identified. In order to provide an illustrative numerical example, consider a Knuth solution that includes 25 vertices. This means that, with the Knuth solution, each of 25 blocks of software needs to be provided with a probe. Each of the 25 blocks also has a counter associated with it. Each counter is incremented when the probe in the block with which it is associated is activated by execution of the block.

In this numerical example, assume that the algorithm of this example results in a list of 6 of the 25 vertices that are redundant. So any of these six vertices could possibly be eliminated, and still leave sufficient information available for tracing. So, if any one of the 6 vertices in the list is not provided with a probe, sufficient information can still be gathered to allow tracing. The first step of the algorithm of this example is to compile this list of six vertices.

Assume now that one of the six vertices is eliminated. This leaves a tracing solution that consists of only a reduced set of 24 vertices. Probes are only included in the blocks corresponding to the reduced set of 24 vertices. However, there will still be 25 counters. The counter associated with the vertex that has been eliminated will be incremented when one or more of the remaining 24 probes is activated. This is similar to the situation in FIG. 3, where the counter for block 320 is incremented when the program control flow passes from block 310 to block 330.

The next step of the algorithm is to examine the solution consisting of the reduced set of 24 vertices again, to see if any further vertices can be eliminated. We assume now that a list of 3 vertices is found, each of which could be eliminated with sufficient information still being available for a tracing solution.

The next step is to eliminate one of the three vertices, to provide a tracing solution with a reduced set of 23 vertices. There are still 25 counters. Each of the two counters that were originally associated with vertices that have now been removed will be incremented when one or more of the remaining 23 probes is activated.

It is now possible to examine the solution that comprises the reduced set of 23 vertices, and see if any further vertices can be eliminated. Assume that the result is that none of the 23 vertices can be eliminated. In this case, the tracing solution with the reduced set of 23 vertices is a 'locally minimal' solution.

FIG. 4 illustrates an example of a method 400 in accordance with the invention, as described in connection with the specific numerical example above.

In step 410, the method starts with an initial tracing solution. The initial tracing solution might be a Knuth profiling solution, or a tracing solution derived by any other method. For example, the initial tracing solution may simply be a solution in which every block of code in a piece of software is instrumented with a probe.

In step 420, the algorithm checks to see if there are any redundant vertices. The result may be that there are no redundant vertices in the initial set. In this case, the method passes directly to step 440, which is described below. If there are no redundant vertices in the initial set, then the initial solution of step 410 is already a locally minimal solution. In this case, the method of this example only serves to prove that the initial solution cannot be improved upon, for tracing. If the initial solution was a Knuth solution, then method 400 may in some cases therefore only demonstrate that the particular Knuth solution was both a minimal solution for profiling in terms of counter placement, and a locally minimal solution for tracing. However, this is not expected to be the usual situation.

If the result of step 420 is that there are one or more redundant vertices, then the method passes to step 430. In step 430, one of the redundant vertices is removed. In step 430 therefore, the initial tracing solution is improved to provide a tracing solution that is better than the initial tracing solution. The result of step 430 can be referred to as a reduced set of vertices. Each of these will need to be provided with a probe.

From step 430, the algorithm passes back to step 420. A new check is made for redundant vertices. If there are no redundant vertices, then the method proceeds to step 440. If step 420 finds that there are one or more redundant vertices, then the method passes once again to step 430, where one of the redundant vertices is removed, and then back to step 420. The algorithm passes around the loop between steps 420 and 430 until step 420 finds that there are no more redundant vertices.

The algorithm finishes at step 440. The set of vertices remaining when the algorithm reaches step 440 is a locally minimal solution to the tracing problem. All the vertices that remain in the locally minimal solution can then be instrumented with probes.

The whole process of finding a locally minimal tracing solution from the Knuth profiling solution can be understood from consideration of FIGS. 1, and 5-7.

FIG. 5 shows an initial tracing solution graph of the Knuth profiling solution. The tracing solution graph in FIG. 5 comprises selected vertices from the graph in FIG. 1. Only vertices 5, 6, 9, 11, 12 and 13 are included in FIG. 5.

Figure 6:
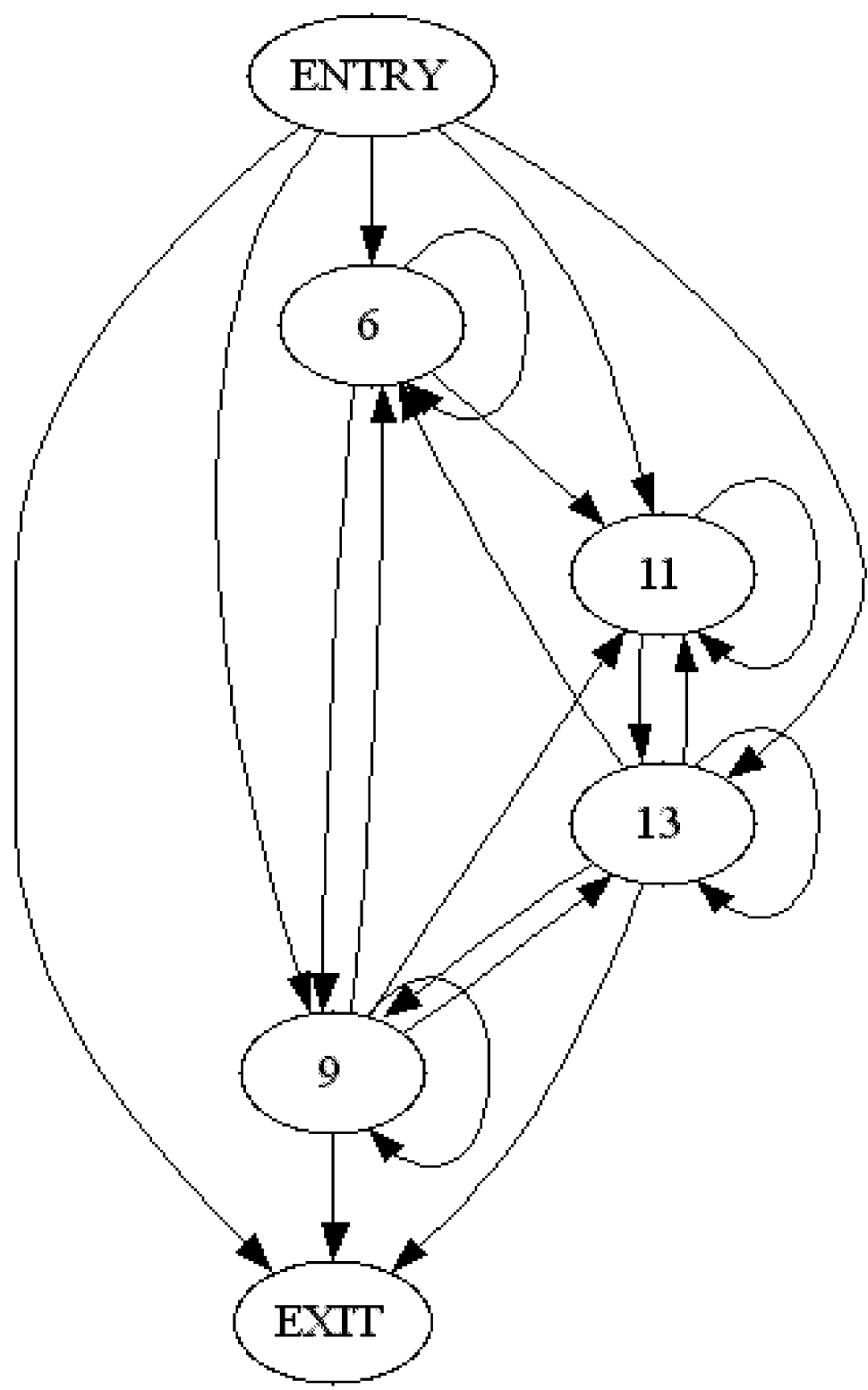

FIG. 6 illustrates the final result of applying the algorithm of this example described in FIG. 4 to the tracing solution graph of FIG. 5. FIG. 6 is a locally minimal solution, and includes only vertices 6,9,11 and 13.

By comparing FIGS. 5 and 6, it is clear that redundant vertices have been systematically removed from the tracing solution graph of FIG. 5 to arrive at the locally minimal tracing solution of FIG. 6. Note that there is no redundant vertex in FIG. 6. In contrast, there are two redundant vertices in FIG. 5, namely vertices 5 and 12.

Figure 7:
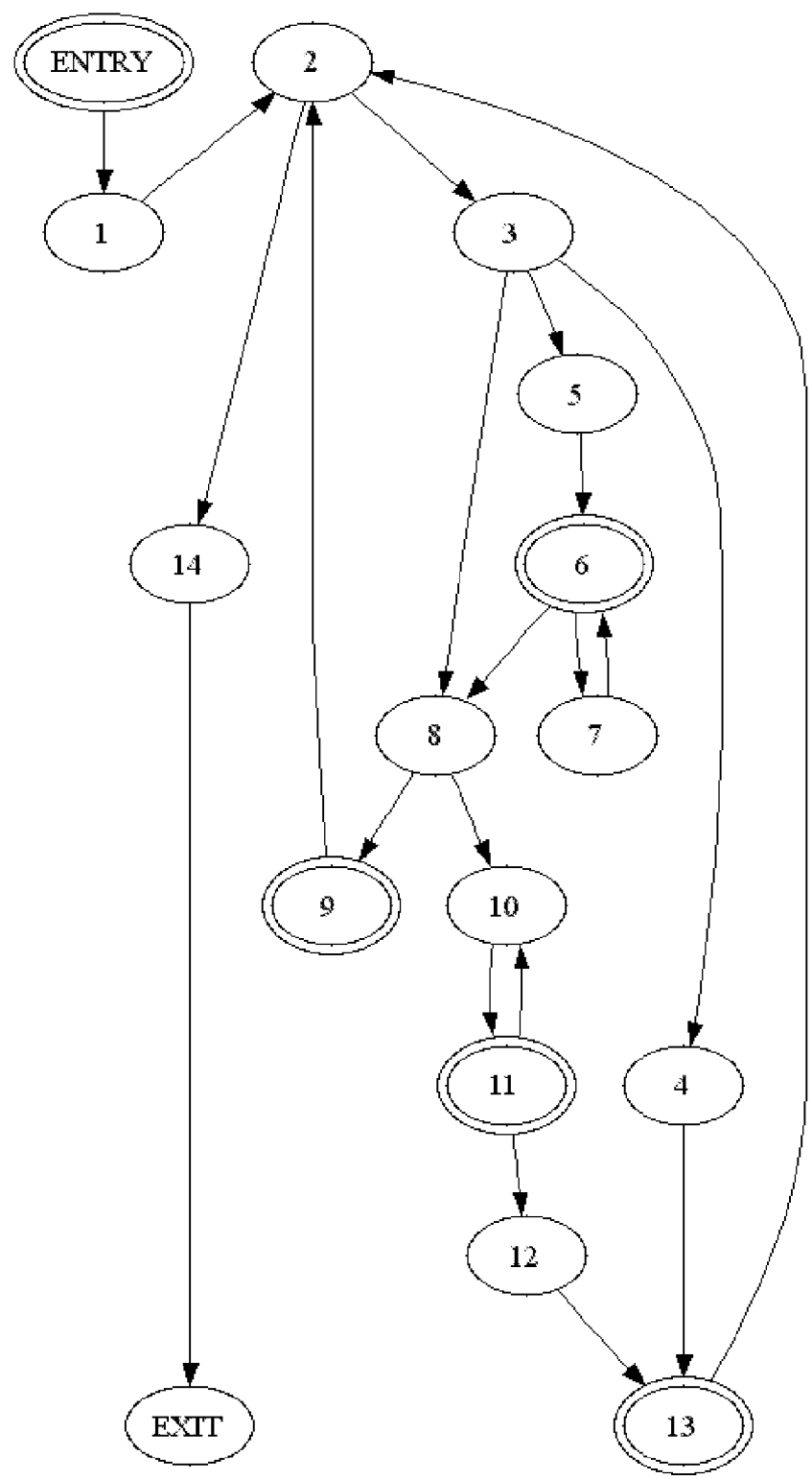

FIG. 7 repeats FIG. 1, the original control flow graph. However, FIG. 7 highlights the four vertices that are required for the minimal tracing solution. These are vertices 6, 9, 11 and 13, which are shown as double ovals.

Figure 8:
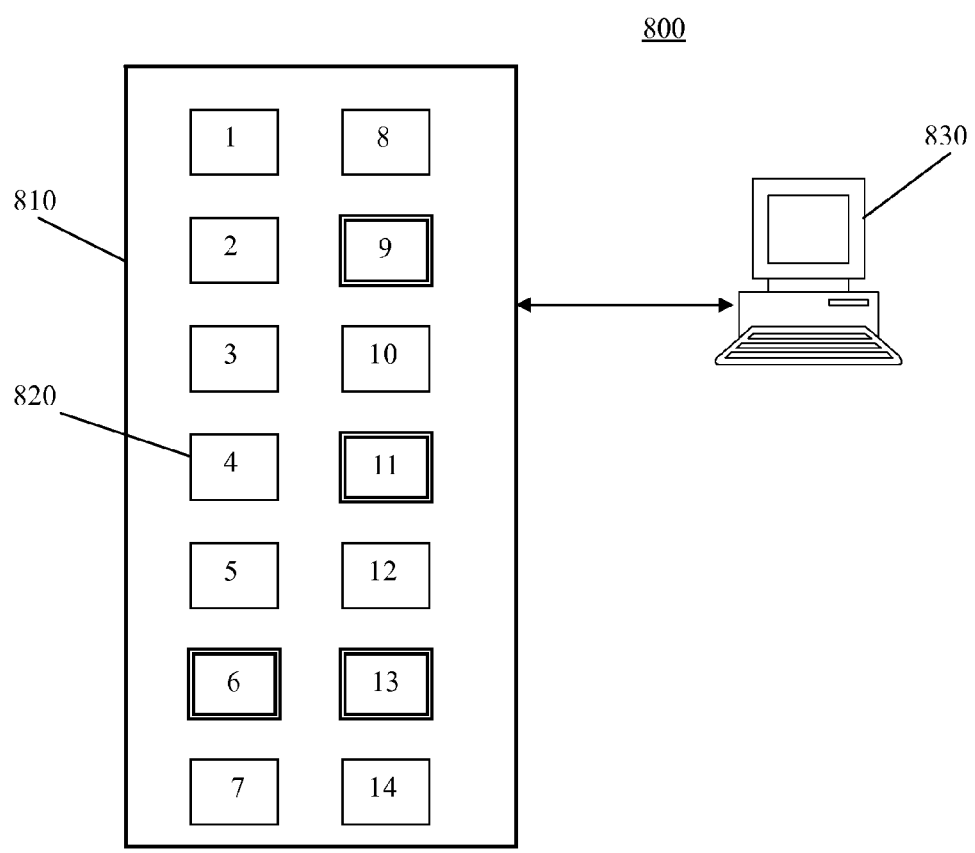
FIG. 8 shows an example of an embodiment of a system.

FIG. 8 shows an example of this example. System 800 monitors the operation of blocks of code on an integrated circuit. System 800 comprises a program 810 having blocks of code 820 for running on the integrated circuit. A sub-set of the blocks 820 is instrumented with probes assigned in accordance with a tracing solution derived according to the invention. In FIG. 8, the blocks of code 820 are labeled from 1-14. Each of blocks 1-14 in FIG. 8 corresponds to a vertex 1-14 in FIGS. 5, 6 and 7. Blocks 6, 9, 11 and 13 are instrumented with probes, and have been shown on FIG. 8 with a double border. A personal computer (830), or other data recording system linked to the program (810), can then be used to receive data provided by the probes.

The present invention also comprises the use of a locally minimal tracing solution for profiling. The solution probes for tracing are used for incrementing the counters that were originally allocated by the Knuth profiling solution. Since the number of probes is either equal to or less than the number in the Knuth profiling solution, this invention provides better probe placement than the Knuth solution, and yet can still increment the same set of counters.

Finally, the present invention suggests that it is optimal to start the search for the locally minimal solution from the optimal counter placement solution.

Combining the idea of a locally minimal solution, the algorithms for identifying and finding a locally minimal solution, and the solution of counter placement can very often result in an optimal or almost optimal solution to the tracing problem.

The Knuth counter placement solution known in the prior art finds counter assignments that minimize and also optimize the counter overhead. This is achieved by the allocation of counters to less executed locations. Since the Knuth counter assignment solution also solves the tracing problem, the solution was considered in the prior art as almost optimal for the tracing problem. However, if we start searching for a locally minimal tracing solution from the counter assignment solution, then the locally minimal solution provided by the invention, and the associated algorithms, usually allow a better solution to be found. The solution to the profiling problem provided by the invention, based on the locally minimal tracing solution, will either be an equivalent to, or be better than, the profiling solution of reference [1].

In many applications, the locally minimal tracing solution can simply be used to reconstruct a trace. In this case, activation of a probe simply leads to activation of a token. The token indicates that a block was executed. The trace then consists of a sequence of tokens.

If the locally minimal tracing solution is to be used to provide profiling data, then activation of a probe is arranged to lead to increment of a counter.

The locally minimal tracing solution can also be used to infer code coverage. In that case, probes mark the blocks that were executed, including the vertices that do not have probes assigned to them.

For the graph in FIG. 1, the present invention provided better results than the vertex domination mechanism used for probe reduction in reference [6].

The invention may be used to provide a method of monitoring the operation of blocks of code. Starting from a locally minimal tracing solution derived in accordance with the invention, blocks of code of the computer program that correspond to vertices in the tracing solution are instrumented with probes. The data provided by the probes can then be recorded. The invention may also provide an integrated circuit comprising software optimized by analyzing data collected in accordance with this monitoring method.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different information processing systems. For example, although FIG. 8 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used to implement examples of the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, circuitry may be located on a single integrated circuit or within a same device. Alternatively, the system may include any number of separate integrated circuits or separate devices interconnected with each other. For example, the system of claim 11 or portions thereof, may be soft or code representations of physical circuitry or of logical representations convertible into physical circuitry. As such, parts of the system may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, the system of claim 11 may be a computer system, such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of developing a tracing solution for the execution of blocks of computer code, comprising:
   (i) representing each block of code of an initial tracing solution as a vertex on an initial tracing solution graph, the vertices on the initial tracing solution graph constituting an initial set of vertices;
   (ii) checking whether there are any redundant vertices in the initial set of vertices, comprising:
      for each vertex of the initial tracing solution graph:
         identifying all immediately preceding vertices in the initial tracing solution graph, an immediately preceding vertex being one that lies at the tail of an edge connected to the vertex;
         identifying all immediately succeeding vertices in the initial tracing solution graph, an immediately succeeding vertex being one that lies at the head of an edge connected to the vertex; and
         classifying the vertex as redundant if there is no edge that directly links an immediately preceding vertex to an immediately succeeding vertex;
   (iii) if there are any redundant vertices in the initial set of vertices of the initial tracing solution graph, reducing the initial tracing solution graph by eliminating at least one of the redundant vertices from the initial set of vertices of the initial tracing solution graph, thereby deriving a reduced set of vertices.

2. A method in accordance with claim 1, further comprising:
   if there are redundant vertices in the initial set of vertices, selecting the reduced set of vertices as a tracing solution; or
   if there are no redundant vertices in the initial set of vertices, selecting the initial set of vertices as a tracing solution.

3. A method in accordance with claim 1, further comprising, if there is a reduced set of vertices:
   (iv) constructing a reduced tracing solution graph, the tracing solution graph comprising only:
      a) vertices that are part of the reduced set; and
      b) edges representing paths between the vertices in the reduced set;
   (v) checking whether there are any redundant vertices in the reduced set, by checking for any redundant vertices on the reduced tracing solution graph;
   (vi) if there are any redundant vertices in the reduced set, then eliminating one redundant vertex;

(vii) repeating:
   a) constructing a reduced tracing solution graph;
   b) checking whether there are any redundant vertices; and
   c) eliminating one redundant vertex;
until there are no further redundant vertices, thereby deriving a locally minimal reduced set of vertices.

4. A method in accordance with claim 3, further comprising:
   selecting the locally minimal reduced set of vertices as a tracing solution.

5. A method in accordance with claim 2, further comprising:
   instrumenting each block corresponding to a vertex of the tracing solution with a probe; and
   associating a token with each probe, in order to provide tracing information and/or code coverage information.

6. A method in accordance with claim 3 further comprising:
   developing a profiling solution from the tracing solution by:
      assigning a counter to each vertex of an initial profiling solution; and
      assigning probes only to vertices included in either the reduced set of vertices or the locally minimal reduced set of vertices; and
      for each counter assigned to a vertex that does not have a probe, arranging for the counter to be incremented by a probe that is assigned to another vertex.

7. A method in accordance with claim 3 further comprising:
   developing a code coverage solution from the tracing solution by:
   assigning a token to each vertex of the initial set of vertices of the initial tracing solution graph; and
   assigning probes only to vertices included in either of the reduced set of vertices or the locally minimal reduced set of vertices;
   for each token assigned to a vertex that does not have a probe, arranging for the token to be marked by a probe that is assigned to another vertex.

8. A method of monitoring the operation of blocks of code, comprising:
   instrumenting the blocks of code of the computer program that correspond to vertices in a tracing solution with probes derived by
      (i) representing each block of code of an initial tracing solution as a vertex on an initial tracing solution graph, the vertices on the initial tracing solution graph constituting an initial set of vertices;
      (ii) checking whether there are any redundant vertices in the initial set of vertices, comprising:
         for each vertex of the initial tracing solution graph:
            identifying all immediately preceding vertices in the initial tracing solution graph, an immediately preceding vertex being one that lies at the tail of an edge connected to the vertex;
            identifying all immediately succeeding vertices in the initial tracing solution graph, an immediately succeeding vertex being one that lies at the head of an edge connected to the vertex; and
            classifying the vertex as redundant if there is no edge that directly links an immediately preceding vertex to an immediately succeeding vertex;
      (iii) if there are any redundant vertices in the initial set of vertices of the initial tracing solution graph, reducing the initial tracing solution graph by eliminating at least one of the redundant vertices from the initial set of vertices of the initial tracing solution graph, thereby deriving a reduced set of vertices;
      (iv) if there are redundant vertices in the initial set of vertices, selecting the reduced set of vertices as a tracing solution;
      (v) if there are no redundant vertices in the initial set of vertices, selecting the initial set of vertices as a tracing solution; and
   recording data provided by the probes.

9. A system for monitoring the operation of blocks of code on an integrated circuit, comprising:
   a program comprising blocks of code for running on the integrated circuit, a sub-set of the blocks being instrumented with probes configured to:
      (i) represent each block of code of an initial tracing solution as a vertex on an initial tracing solution graph, the vertices on the initial tracing solution graph constituting an initial set of vertices;
      (ii) check whether there are any redundant vertices in the initial set of vertices, comprising:
         for each vertex of the initial tracing solution graph:
            identifying all immediately preceding vertices in the initial tracing solution graph, an immediately preceding vertex being one that lies at the tail of an edge connected to the vertex;
            identifying all immediately succeeding vertices in the initial tracing solution graph, an immediately succeeding vertex being one that lies at the head of an edge connected to the vertex; and
            classifying the vertex as redundant if there is no edge that directly links an immediately preceding vertex to an immediately succeeding vertex;
      (iii) if there are any redundant vertices in the initial set of vertices of the initial tracing solution graph, reduce the initial tracing solution graph by eliminating at least one of the redundant vertices from the initial set of vertices of the initial tracing solution graph, thereby deriving a reduced set of vertices;
      (iv) if there are any redundant vertices in the initial set of vertices, select the reduced set of vertices as a tracing solution;
      (v) if there are no redundant vertices in the initial set of vertices, select the initial set of vertices as a tracing solution; and
   a personal computer or other data recording system linked to the program, for receiving data provided by the probes.

10. A system in accordance with claim 9, further comprising:
   if there are redundant vertices in the initial set of vertices, selecting the reduced set of vertices as a tracing solution; or
   if there are no redundant vertices in the initial set of vertices, selecting the initial set of vertices as a tracing solution.

11. A system in accordance with claim 9, further comprising, if there is a reduced set of vertices:
   (iv) constructing a reduced tracing solution graph, the tracing solution graph comprising only:
      a) vertices that are part of the reduced set; and
      b) edges representing paths between the vertices in the reduced set;
   (v) checking whether there are any redundant vertices in the reduced set, by checking for any redundant vertices in the reduced set, then eliminating one redundant vertex;

(vii) repeating:
   a) constructing a reduced tracing solution graph;
   b) checking whether there are any redundant vertices; and
   c) eliminating one redundant vertex;
until there are no further redundant vertices, thereby deriving a locally minimal reduced set of vertices.

12. A system in accordance with claim 11, further comprising:
   selecting the locally minimal reduced set of vertices as a tracing solution.

13. A system in accordance with claim 11, the program further configured to:
   instrument each block corresponding to a vertex of the tracing solution with a probe; and
   associate a token with each probe, in order to provide tracing information and/or code coverage information.

14. A system in accordance with claim 11, further comprising:
   developing a profiling solution from the tracing solution by:
      assigning a counter to each vertex of an initial profiling solution; and
      assigning probes only to vertices included in either the reduced set of vertices or the locally minimal reduced set of vertices;
      for each counter assigned to a vertex that does not have a probe, arranging for the counter to be incremented by a probe that is assigned to another vertex.

15. A system in accordance with claim 9, further comprising:
   assigning a token to each vertex of the initial set of vertices of the initial tracing solution graph; and
   assigning probes only to vertices included in either the reduced set of vertices or the locally minimal reduced set of vertices;
   for each token assigned to a vertex that does not have a probe, arranging for the token to be marked by a probe that is assigned to another vertex.

16. A method in accordance with claim 8, further comprising:
   if there are redundant vertices in the initial set of vertices, selecting the reduced set of vertices as a tracing solution; or
   if there are no redundant vertices in the initial set of vertices, selecting the initial set of vertices as a tracing solution.

17. A method in accordance with claim 8, further comprising, if there is a reduced set of vertices:
   (iv) constructing a reduced tracing solution graph, the tracing solution graph comprising only:
      a) vertices that are part of the reduced set; and
      b) edges representing paths between the vertices in the reduced set;
   (v) checking whether there are any redundant vertices in the reduced set, by checking for any redundant vertices on the reduced tracing solution graph;
   (vi) if there are any redundant vertices in the reduced set, then eliminating one redundant vertex;
   (vii) repeating:
      a) constructing a reduced tracing solution graph;
      b) checking whether there are any redundant vertices; and
      c) eliminating one redundant vertex;
   until there are no further redundant vertices, thereby deriving a locally minimal reduced set of vertices.

18. A method in accordance with claim 17, further comprising:
   selecting the locally minimal reduced set of vertices as a tracing solution.

19. A method in accordance with claim 17, further comprising:
   instrumenting each block corresponding to a vertex of the tracing solution with a probe; and
   associating a token with each probe, in order to provide tracing information and/or code coverage information.

20. A method in accordance with claim 17 further comprising:
   developing a profiling solution from the tracing solution by:
      assigning a counter to each vertex of an initial profiling solution; and
      assigning probes only to vertices included in either the reduced set of vertices or the locally minimal reduced set of vertices; and
      for each counter assigned to a vertex that does not have a probe, arranging for the counter to be incremented by a probe that is assigned to another vertex.

* * * * *